May 29, 1956

R. W. WENGEL

2,747,457

PNEUMATIC ARRANGEMENT FOR ADVANCING
AND REGISTERING A FILM STRIP

Filed Nov. 17, 1950

Raymond W. Wengel
Inventor

Daniel I. Mayne
George A. Gillette, Jr.
Attorneys

May 29, 1956 R. W. WENGEL 2,747,457
PNEUMATIC ARRANGEMENT FOR ADVANCING
AND REGISTERING A FILM STRIP
Filed Nov. 17, 1950 6 Sheets-Sheet 2

Raymond W. Wengel
Inventor

Daniel J. Mayne
George A. Gillette, Jr.
Attorneys

May 29, 1956

R. W. WENGEL

2,747,457

PNEUMATIC ARRANGEMENT FOR ADVANCING
AND REGISTERING A FILM STRIP

Filed Nov. 17, 1950

Raymond W. Wengel
Inventor

Daniel J. Mayne
George A. Gillette, Jr.
Attorneys

May 29, 1956

R. W. WENGEL 2,747,457

PNEUMATIC ARRANGEMENT FOR ADVANCING
AND REGISTERING A FILM STRIP

Filed Nov. 17, 1950

Raymond W. Wengel
Inventor

Daniel J. Mayne
George A. Gillette, Jr.
Attorneys

United States Patent Office 2,747,457
Patented May 29, 1956

2,747,457

PNEUMATIC ARRANGEMENT FOR ADVANCING AND REGISTERING A FILM STRIP

Raymond W. Wengel, Rochester, N. Y., assignor to Eastman Kodak Company, Rochester, N. Y., a corporation of New Jersey Application November 17, 1950, Serial No. 196,152

5 Claims. (Cl. 88—18)

This invention relates to photographic apparatus and more particularly to an arrangement whereby a film strip is intermittently advanced past an exposure or projection aperture by means of air under pressure applied alternately to upper and lower film loops formed by the film strip, or continuously to the lower loop, and wherein the images on the film strip are maintained in registry with the aperture by air applied under pressure alternately to the lower film loop and the upper film loop, or to the lower film loop or the upper film loop continuously.

Although mechanical intermittent advancing mechanisms of various types are well-known, they possess certain disadvantages because of their inability to be adapted to moving a film strip at a relatively high speed without causing excessive strains in the film strip which usually result in torn or damaged film perforations and because of the wear encountered by the various reciprocating and moving parts. A major advantage secured through the present invention by utilizing air flow, or pressure, for intermittently moving and registering the film strip is the elimination of all reciprocating parts, or at least reducing them to a minimum of weight. Another advantage lies in the speed with which pull-down may be accomplished without producing strains in the film of the magnitude of those caused by the conventional type of pull-down mechanism. Other advantageous features are also incorporated in the present invention, such as exact registration of the image area on the film strip with the aperture, the elimination of gate shoes, and the convenience with which resilient mounting of all moving parts can be made.

The primary object of the invention, therefore, is the provision of a photographic apparatus in which the film strip is intermittently advanced past an aperture in a gate member by air under pressure applied against one of the loops formed by the film strip.

Another object of the invention is the provision of a photographic apparatus in which air under pressure is applied to a loop formed by the film strip for moving the film strip rearwardly to obtain proper registration of an image on said film strip with an aperture in the gate member and to maintain said image in a properly registered position with respect to said aperture.

Still, another object of the invention is the provision of a photographic apparatus in which a film-positioning pin is located adjacent the aperture in the gate member for intermittently engaging the perforations in a film strip, and air under pressure is applied to a loop formed by the film strip, the air pressure tending to expand the same to concurrently cause retrograde movement of the film strip for moving an edge of the perforation in engagement with the positioning pin against a surface thereof and to maintain said edge against said surface of the positioning pin.

Yet, another object of the invention is the provision of a photographic apparatus in which a film-positioning pin is located adjacent the aperture in the gate member and air under pressure is applied alternately to a lower loop and to an upper loop formed by the film strip, the air under pressure applied to the lower loop tending to expand the same to move the film past the aperture and rapidly contract the upper loop, and the air under pressure applied to the upper loop tending to expand the same to move an edge of the perforation engaging said positioning pin against a surface thereof and to maintain said edge against said surface of the positioning pin.

A still further object of the invention is the provision of a photographic apparatus in which a film-positioning pin is located adjacent the aperture in the gate member and air under pressure is applied continuously to a loop formed by the film strip below the gate member, the air under pressure applied to said lower loop tending to expand the same to move the film strip past said aperture after the perforation in engagement with said pin has been removed therefrom and to maintain an edge of the next succeeding predetermined perforation in engagement with a surface of said positioning pin.

And yet, another object of the invention is the provision of a photographic apparatus in which a film-positioning pin is located adjacent the aperture in the gate member and air under pressure is applied continuously to a loop formed by the film strip above the gate member to move the film strip rearwardly so that an edge of the perforation engaging said positioning pin engages a fixed surface on said pin and to maintain said edge against said surface of the positioning pin.

Other objects and advantages of the invention will be apparent to those skilled in the art by the description which follows.

The above-mentioned and other objects of the invention are embodied in photographic apparatus having a gate member provided with an aperture and advancing means for engaging spaced portions of a film strip and for continuously feeding said film strip into an upper preformed film loop. An air chamber is located above and below the gate member and adjacent thereto, each of the air chambers having an open end adapted to be substantially enclosed by the film strip. Adjacent the aperture in said gate member, a film-positioning pin is fixed for intermittently engaging a perforation in the film strip to register an image thereon with said aperture, said pin having a surface in a fixed plane with respect to the direction of film movement. Air under pressure is applied to the upper and lower air chambers and valve means control the application of said air under pressure to the respective chambers in properly timed relation to the period of film advance and the period of film rest. The air under pressure in the lower air chamber tends to expand the film loop for moving the film strip past the aperture and rapidly contract the upper loop to position the succeeding predetermined film perforation opposite to and in position for engagement by said positioning pin. The air under pressure in the upper air chamber tends to expand the contracted upper loop, thereby moving the film strip in a reverse direction until one edge of the perforation engaging said positioning pin abuts said surface thereof and maintains said edge against said surface of the positioning pin. The valve means for each chamber are operatively connected and a drive means rotates said valve means in properly timed relation so that said air under pressure is completely cut off from one chamber before being admitted to the other chamber. Thus, the present invention is not to be limited by the illustrated embodiment thereof, but has a scope as broad as the interpretation of the claims permit.

Reference is now made to the accompanying drawings wherein similar characters designate similar elements, and wherein.

Although the illustrated embodiments of the invention are disclosed and described in connection with photographic projection apparatus, it is to be understood that the various arrangements may be applicable to and adapted for use on motion-picture cameras, photographic printers, photographic viewers, or any other type of apparatus where a strip material must be intermittently advanced and spaced portions thereof properly registered with respect to an aperture or station.

In the preferred form of the invention disclosed in Figs. 1–8, the casing 10 comprises a substantially airtight enclosure 11 including a mechanism chamber 12 and a lamphousing 13 which are mounted on or formed integral with the base member 14. The lamphousing 13 encloses the reflector 15, lamp 16 and condenser lens system 17 in a well-known manner; the optical axis of the condenser system being aligned with aperture 18 in gate member 19, which is fixed to cover 23, and the optical axis 20' of the projection lens system designated by numeral 20. A suitable shutter 21 is located between condenser lens system 17 and gate member 19 in a manner similar to that disclosed in Fig. 9. The casing 10 is enclosed by covers 22 and 23, respectively, to provide access to the interior of said casing. The film strip "F" is drawn from reel 24 mounted on arm 25 forming a part of casing 10 and has a path which passes under idler roller 26, over the sprocket 27 with which it is maintained in contact by holding roller 28, past the aperture 18 in gate member 19, between sprocket 29 and holding roller 30 and over idler roller 31 to take-up reel 32 on arm 33. The rollers, sprockets, gate member and projection lens are mounted on the cover 23 and are enclosed by cover 34 provided with suitable apertures for admitting light to the film strip at the aperture and for permitting movement of the film strip into and out of the above-described film path and having a portion 35 for receiving projection lens system 20.

The sprockets 27 and 29 are continuously driven through gear trains 36 and 37, respectively, which are driven by motor 38. Motor shaft 39 drives gears 40 and 41, the gear 40 driving idler gear 42, which, in turn, drives pinion 43 in train 37. Gear train 37 comprises pinion 43 secured to shaft 44, the gear 45 secured to shaft 44, gears 46 and 47 mounted on shaft 48 which is secured to the L-shaped lever 49 pivotally mounted on shaft 44, and gear 50 secured to sprocket shaft 51, see Fig. 8. Gears 45, 46, 47 and 50, therefore, constitute a planetary system which is actuated by lever 49 for a purpose to be described hereinafter. Gear train 36 comprises pinion 41 on motor shaft 39, gear 52 and pinion 53 on stub shaft 54, and gear 55 on sprocket shaft 56. Sprockets 27 and 29 are, therefore, continuously driven through gear trains 36 and 37 for feeding the film strip into a preformed upper loop "L" and from a preformed lower loop "L₁." While in the present disclosure sprockets are disclosed as an advancing means for engaging spaced portions of a film strip and for moving the film strip continuously, plain cylindrical rollers or contacting rubber-covered rollers may also be used.

Figure 1:
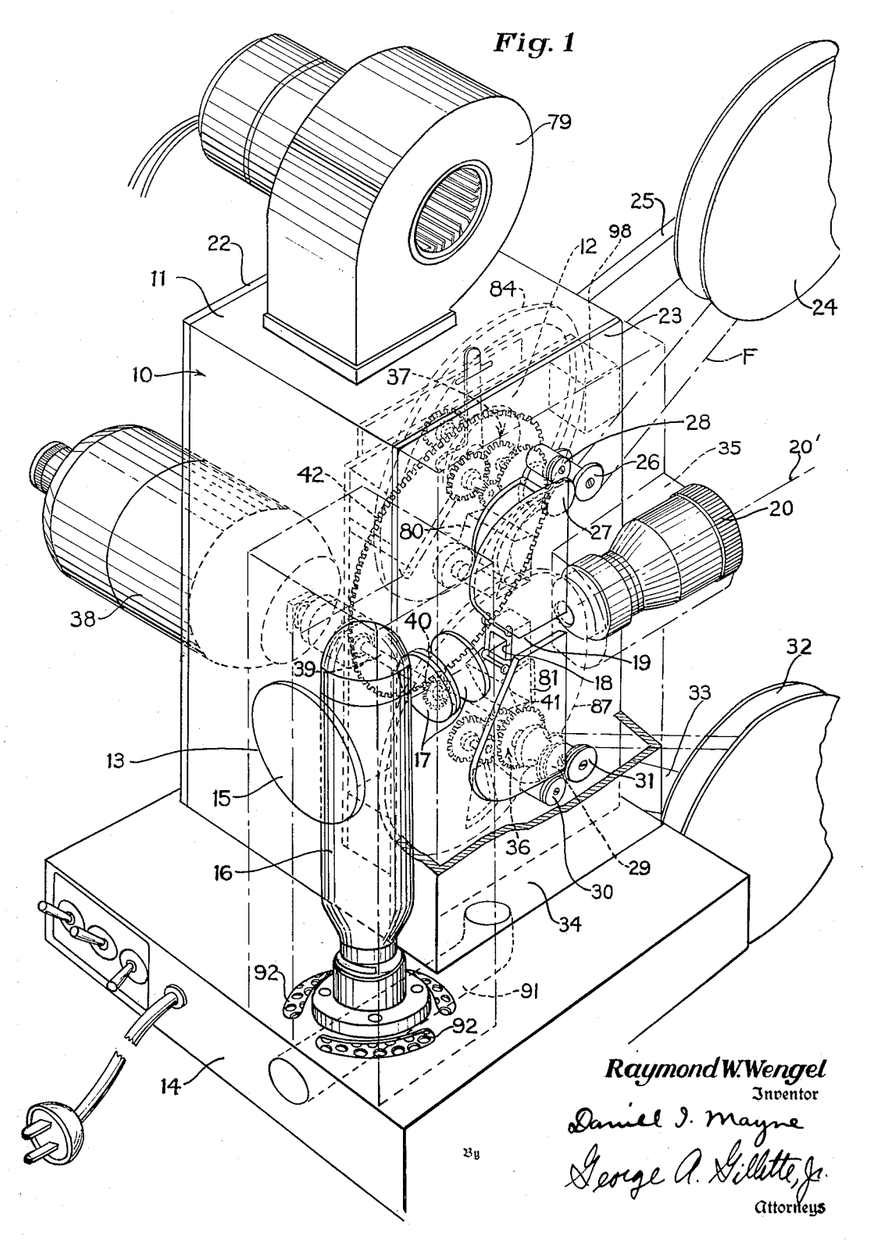
Fig. 1 is a perspective view of a film projection apparatus embodying the preferred form of the invention in which the film strip is advanced and registered by air under pressure applied alternately to the lower and upper film loops, respectively.
Figure 2:
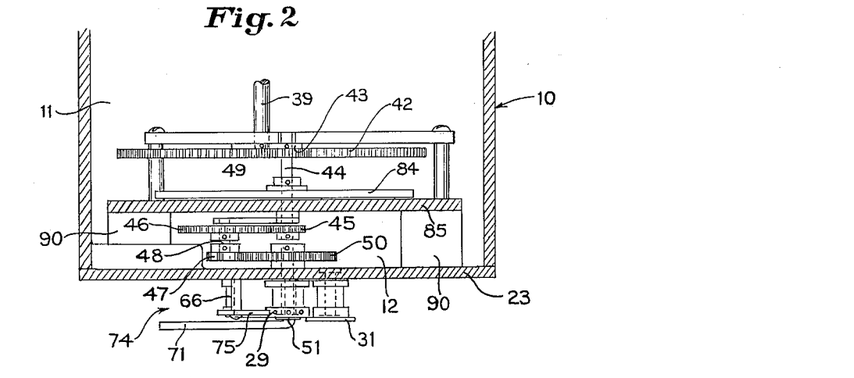
Fig. 2 is a horizontal section through the projection apparatus and showing the arrangement of the valve means in relation to the mechanism chamber and sprocket means for continuously advancing the film strip.
Figure 3:
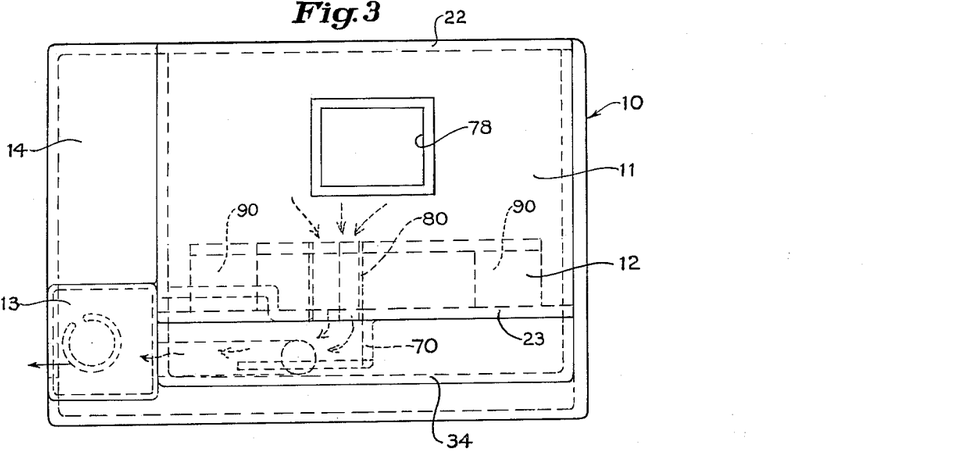
Fig. 3 is a plan view of the casing in which the entire mechanism is housed and showing the cover for enclosing the film strip advancing mechanism and the direction of air flow.
Figure 4:
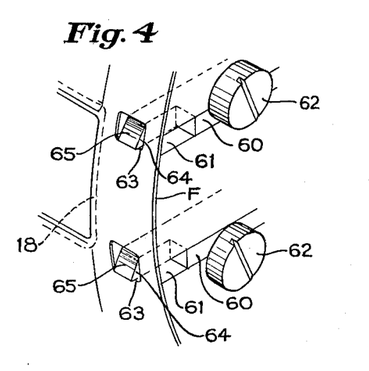
Fig. 4 is a detail perspective view and showing the positioning pins adjacent the exposure aperture and the engagement of one edge of the film perforation with the fixed surface of a positioning pin.

Adjacent aperture 18, see Fig. 4, a pair of film-positioning pins 60 are mounted in grooves 61 in gate member 19, spaced apart by the normal pitch of the film perforation in the direction of film movement, and secured in position by screws 62. The under surface 63 of pins 60 provides a fixed plane which is substantially perpendicular to the direction of film movement and the perforation engaging portion 64 is smaller dimensionally than the film perforations which are intermittently engaged thereby. The front surface 65 of pin 60 is tapered to permit the film strip to slide off said pin when it is advanced, as described hereinafter. While only one pin may be used, it has been found that two spaced pins definitely insure proper registration of the image areas adjacent a splice in the film strip. Suitable side guides for the film strip may be provided on said gate member. Rollers 66, on each side of the gate aperture, are so located that the elastic forces of the film strip arising from bending partly around the rollers tends to hold it down against the gate rails, not shown.

Figures 6, 7, 8:
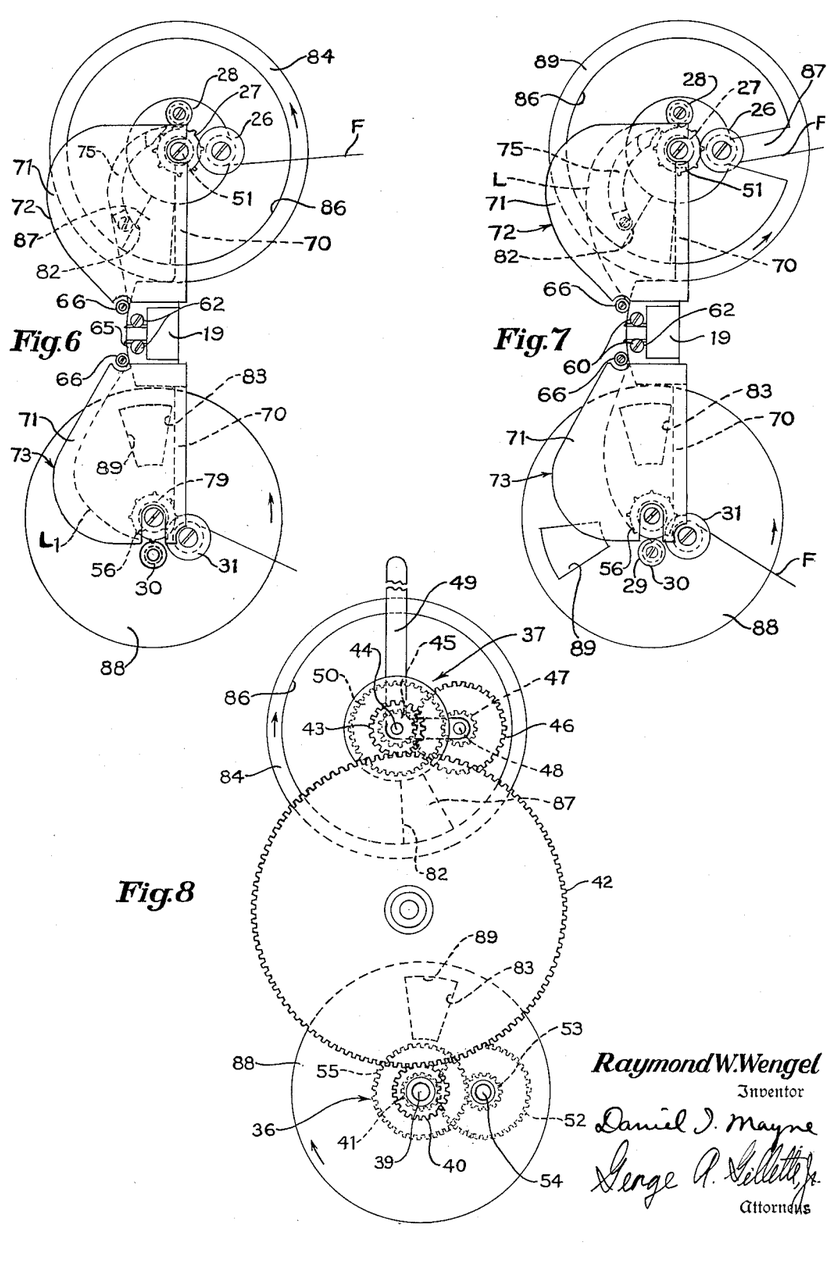
Fig. 6 is a diagrammatic right side elevation of the preferred embodiment of the invention, as shown in Fig. 1, and showing the relative positions of the gate member, film-positioning pins, air chambers and rotary valves; the rotary valves being shown in position for admitting air under pressure to the lower air chamber and blocking the air under pressure from admittance to the upper air chamber.
Fig. 7 is a diagrammatic right side elevation similar to Fig. 6, but showing the rotary valves in position for admitting the air under pressure to the upper chamber and blocking the air under pressure from admittance to the lower chamber.
Fig. 8 is a diagrammatic left side elevation, similar to Figs. 6 and 7, and showing the drive mechanism for operatively connecting and rotating the valve members in synchronism.

Projecting forwardly from cover 23 and abutting gate member 19 at the inner ends are partitions 70 which terminate at the outer ends adjacent sprockets 27 and 29. Plates 71 of the shape best shown in Figs. 6–8 are attached to said partitions. These plates, together with cover 23, form the side walls of air chambers 72 and 73 and provide an open end 74. The partitions 70 are of such height that the inner surfaces of plates 71 are spaced from the outer surface of cover 23 by a distance greater than the width of the film strip for a reason to be explained hereinafter. A shoe 75 is mounted in a fixed or an adjustable position within chamber 72 and engages only the marginal edges of the film strip.

The air enclosure 11 is provided with an aperture 78 and a blower 79 is mounted on the top of said enclosure to supply air under pressure thereto. Ducts 80 and 81 connect enclosure 11 with the apertures or ports 82 and 83, respectively, in cover 23; the ports 82 and 83 being located adjacent partitions 70, as shown in Figs. 6 and 7. A rotary valve 84 is mounted on shaft 44 adjacent the plate 85 which separates enclosure 11 and chamber 12 and is provided with an aperture 86 and a solid portion 87 aligned with and adapted to close port 82, respectively. A second rotary valve 88 is mounted on shaft 39 adjacent plate 85 and is provided with an aperture 89 aligned with port 83. Plate 85 is spaced from cover 23 by resilient blocks 90 which reduce any vibration noise caused by the mechanism mounted on plate 85 and connected to the sprocket on cover 23. Valves 84 and 88 are driven in synchronism by motor 38; valve 84 being driven through gear 40, idler gear 42 and pinion 43 and valve 88 being driven directly since it is mounted on motor shaft 39. It will be noted with respect to Fig. 6 that when aperture 89 in valve 88 is aligned with port 83, the portion 87 of valve 84 has completely closed port 82, and when aperture 86 in valve 84 is aligned with port 82, port 83 is completely closed by portion 87, as shown in Fig. 7. The operation of valves 84 and 88 and their relation to the proper functioning of the apparatus will best be understood by a description of a complete cycle of operation which may best be understood by starting with portion 87 of valve 84 beginning to close port 82 and aperture 89 of valve 88 beginning to open port 83 which commences the cycle with the pull-down or advancement of the film strip.

The blower 79 supplies air under pressure to enclosure 11 and is applied to the air chambers 72 and 73 via ducts 80 and 81 only when the apertures in valves 84 and 88 open the ports 82 and 83. As valves 84 and 88 are rotated by motor 38, aperture 89 of valve 88 begins to open port 83 admitting air under pressure to chamber 73 and portion 87 of valve 84 begins to close port 82 to cut off the air under pressure being admitted to chamber 72. Since the film strip "F" is confined between cover 23 and plates 71, the film strip substantially encloses or forms a variable boundary for the open end 74 of chambers 72 and 73. The closing of port 82 causes the air pressure in chamber 72 to drop and the opening of port 83 causes the air pressure in chamber 73 to rise. Since the film strip is the only element bounding chamber 73 which is free to expand under the increased air pressure, the force exerted by the air against the film strip tends to expand it. In a like manner, the air under pressure in chamber 72 exerts a force which tends to not only maintain the film strip in a preformed loop as it is fed into said chamber by sprocket 27 but which also holds the film strip so that the lower edges of the perforations engaging pins 60 are maintained against the surface 63 of said pins to properly maintain registration of the image on the film strip with aperture 18 in gate member 19. As valves 84 and 88 are rotated in unison, the air pressure in chamber 73 is increased and the air pressure in chamber 72 is decreased with a corresponding increase and decrease of force on the film strip. When port 83 has been fully opened and port 82 fully closed, the maximum force is then exerted on the film strip between pins 60 and sprocket 29. This force is sufficient to withdraw the film strip perforations from engagement with pins 60 and to move the film strip rapidly downward over the tapered surface 65 and past the aperture 18, thereby contracting the upper film loop against shoe 75 to position the succeeding predetermined film perforation opposite to and in position for engagement by the portions 64 of pins 60, the film strip then having a path such as shown in Fig. 6. The amount of film advanced is determined by the difference in length as measured by the length of film between the lower pin 60 and an instantaneous position of sprocket 27 at the time of pull-down and the length as measured by the contracted position of the film strip which is limited by shoe 75. To insure that the proper amount of film is being advanced to obtain proper registry of the image area with the aperture, the lever 49 is provided for moving the planetary gear system in gear train 36. Upon movement of lever 49 to the right or the left, the sprocket 27 is rotated to adjust the length of film between said sprocket and gate member so that the perforations will be engaged by pins 60.

As valve 88 begins to close port 83, portion 87 of valve 84 begins to open port 82 so that pressure commences to build up in chamber 72 and fall rapidly in chamber 73. The reversal of forces on the film strip causes retrograde movement of the film strip and, preferably, moves the lower edge of the perforation engaging the lower pin 60 against the surface 63 thereof to properly register the image area with aperture 18. Aperture 86 in valve 84 is of such length that port 82 remains open during the projection interval so that air flow into, and pressure within, chamber 72 is maintained and the film strip kept under tension between pins 60 and sprocket 27. At the end of the projection period, port 82 is closed by valve 84, port 83 is opened by valve 88 and the cycle is repeated.

Figure 5:
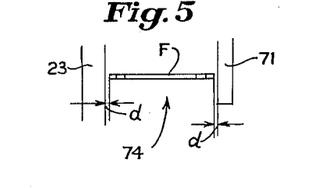
Fig. 5 is a detail view of the open end of an air chamber and showing the relation of the edges of the film strip with respect to the side walls of the chamber.

As shown in Fig. 5, the film strip is spaced by a distance "d" from the cover 23 and plate 71. These clearances and the film perforations permit the air pressure to diminish rapidly by leakage therethrough. Also, since the film strip must conform to the surface of the gate and to the side-guiding surfaces at the gate to secure satisfactory positioning for projection, it follows that any lateral curvature of the film strip will cause the loop to deflect sideways out of the path that a perfectly straight film would take between the sprockets and gate. If the side walls of chambers 72 and 73 are brought too close to the normal film path, they will interfere with the lateral motion of the loop and will cause unsteadiness of the film in the gate. Since the film strip is moved rapidly downward upon advancement, the air under pressure in chamber 72 also acts as a cushioning or dampening medium to prevent the film strip in chamber 72 from being slapped against shoe 75 as the upper film loop is rapidly contracted. This dampening action also prevents waves in the film from traveling back and forth along the film strip which, if not dampened, would result in unsteadiness of the film strip of the gate.

Inasmuch as the air chambers 72 and 73, gate member 19, film drive sprockets 27 and 29, etc., are enclosed by cover 34, the air under pressure discharged from the film loops enters the enclosure provided by cover 34 which, together with discharge pipe 91 connected to said enclosure, constitutes a muffler for the periodic air pulses from the valves and discharges the air under pressure to the atmosphere. It can be seen from the shape of apertures 86 and 89 in the rotary valves that the total air flow into pipe 91 is at a nearly constant rate, although shifting from one loop to the other as the mechanism functions. For this reason, the discharge coefficient of pipe 91 is so designed that the air pulsations are smoothed out and a minimum of noise will be produced by the exhaust. Any desired amount of the discharged or exhaust air is directed from pipe 91 through apertures 92 provided in the base 14 and into lamphousing 13 for aiding in cooling lamp 16.

Various modifications of the structure disclosed and described may be made to accomplish the same results for film pull-down and registry, for instance, the position of loops "L" and "L₁" may be reversed from the positions shown in Figs. 6 and 7, that is, one or both may be convex toward the projection lens. Also, the curvature and position of the loops and air valves 84 and 88 may be so chosen that the film strip is always tangent to the curved gate surface at points outside of the frame in registry with the result that the gate rollers 66 may be eliminated. The valves 84 and 88 may be of any type, such as cylindrical, poppet, slide or shutter, depending on conditions to be met in the design of the machine, and the shape of the apertures 86 and 89 may be altered from the sector shape indicated to secure suitable air flow conditions. The valves 84 and 88 may also be combined into a suitable single valve disk having two apertures, or the valves may be eliminated entirely by the use of piston air pumps delivering directly into chambers 72 and 73 and driven in proper phase with the rest of the mechanism. The air system may also be modified by evacuating the air in the enclosure defined by cover 34 and utilizing convex film loops, such an arrangement will not essentially change the operation as described above. To obtain the best operating results, it may also be necessary to synchronize the valves so that the opening and closing of the ports does not occur simultaneously. That is to say, it may be desirable to provide a lag in the opening or closing of one port with respect to the other to obtain the most efficient operating conditions.

In the projection or exposure of a film strip for motion pictures, the shutter is usually provided with a 72 degree sector for blanking out the illumination. This angular sector also represents a measure of time during which the film must be advanced and registered with the aperture. In the above-described embodiment of the invention, it has been found that the pull-down and registration of the film strip can be accomplished in a time interval equivalent to a 15 degree shutter sector and may be accomplished in a time interval equivalent to a 7 degree shutter sector which is the equivalent in time of the retrace interval of a television tube. In other words, it is possible in photographing the image from a television tube to eliminate the shutter and advance and register the film strip during the retrace interval. Such a system would, of course, depend on the proper choice of air pressure and valves and the use of exhaust ports or valves to permit the air pressure in either chamber to be reduced very quickly to that of the atmosphere.

Figure 9:
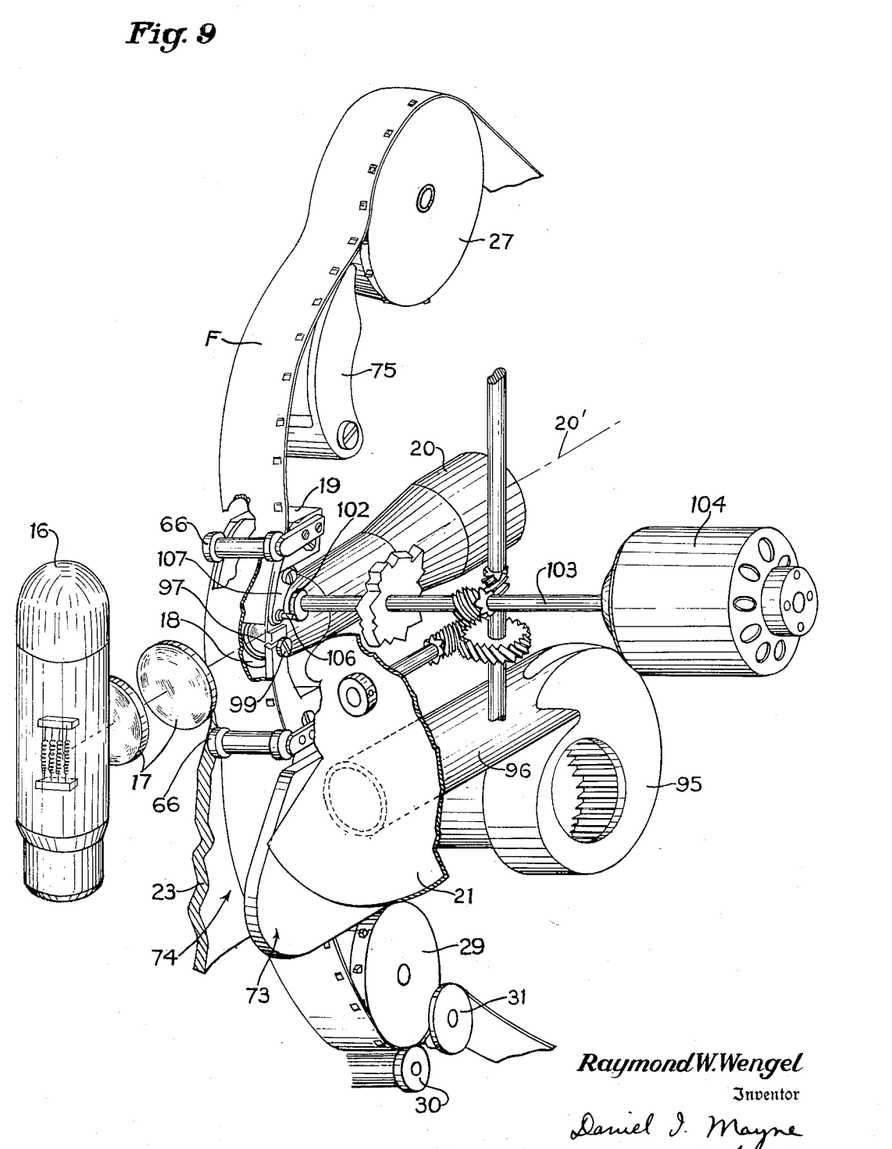
Fig. 9 is a diagrammatic perspective view of a film projection apparatus and showing a second embodiment of the invention in which the film strip is advanced and registered by air under pressure applied continuously to the lower film loop.

In the second embodiment of the invention, as disclosed in Figs. 9–14, the arrangement of the drive for continuously rotating sprockets 27 and 29, the gate member 19, the chambers 72 and 73 and the shoes 75 is exactly the same as that disclosed in Figs. 1–8. However, in this embodiment the air under pressure is applied directly and continuously to chamber 73 and the valves 84 and 88 are eliminated. The air under pressure is supplied by a suitable blower 95, as shown in Fig. 9, or from any other source, and applied by a suitable connection, such as pipe 96, through lower partition 70 to chamber 73. As in the above-described embodiment, a film-positioning pin 97 is secured in groove 98 in gate member 19 by screw 99, the pin having a portion 100 smaller dimensionally than the film perforations for intermittently engaging a film perforation and having a surface 101 for engaging one edge of the perforation to properly register the image area with aperture 18 in gate member 19. A cam 102 is mounted on shaft 103 which is continuously rotated by motor 104 and has a portion 105 adapted to intermittently engage pin 106 secured to the end of lever 107 pivotally mounted on gate member 19 at 108. The cam 102 is rotated in synchronism with shutter 21 and is adapted to engage pin 106 immediately after the aperture 18 has been covered by said shutter to pivot lever 107 in a clockwise direction and into engagement with the film strip for intermittently disengaging the film strip from positioning pin 97 prior to advancement of the film strip.

Figure 10:
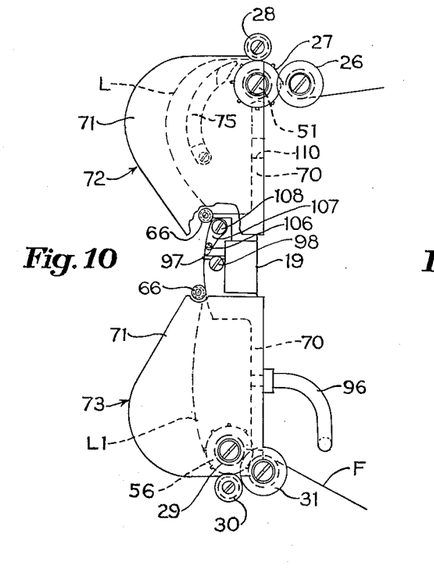
Fig. 10 is a diagrammatic right side elevation of the second embodiment of the invention, as shown in Fig. 9, and showing the relative positions of the gate member, film-positioning pin, air chamber and means for disengaging the film strip from the positioning pin; the film strip being shown in position after having been advanced past the aperture in the gate member and properly registered with said aperture.
Figure 11:
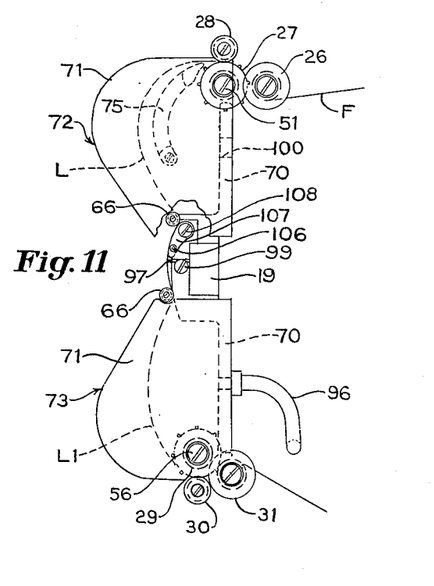
Fig. 11 is a diagrammatic view similar to Fig. 10 and showing the film strip being disengaged from the positioning pin prior to its advancement by the air under pressure that is applied continuously to the lower air chamber.
Figure 12:
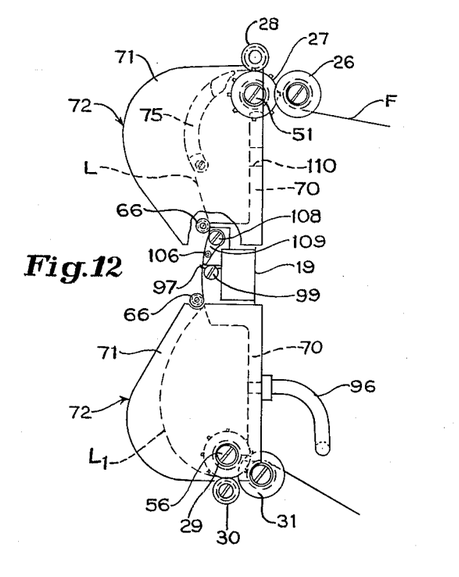
Fig. 12 is a diagrammatic view similar to Fig. 10 and showing the contracted position of the film strip in the upper air chamber immediately after advancement by the air under pressure in the lower chamber in which position of said upper loop the instantaneous position of the upper sprocket means locates the succeeding predetermined film perforation opposite to and in position for engagement by the positioning pin.
Figure 13:
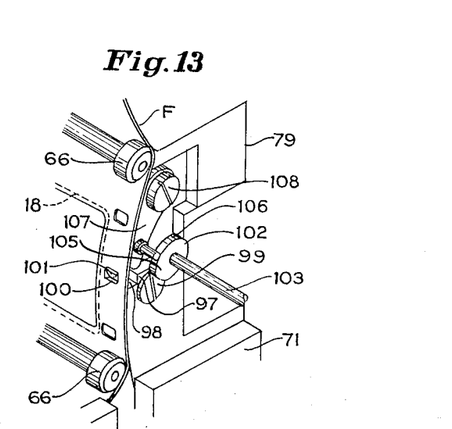
Fig. 13 is a detail perspective view of a portion of the gate member and showing the arrangement for intermittently disengaging the film strip from the film-positioning pin.

In the operation of this second embodiment of the invention, the film strip prior to advancement assumes the form shown in Fig. 10 with the film being preformed into an upper loop as it is continuously fed into chamber 72 by sprocket 27, and the air under pressure being applied to chamber 73 tending to expand the film strip and maintaining it under tension so that the upper edge of the perforation is held against surface 101 of pin 97 as it is continuously fed to the take-up reel by sprocket 29. During the projection, exposure or rest period of the film strip, the upper loop "L" is enlarged by the film being fed into chamber 72 by sprocket 27 while the lower loop "L₁" is being decreased by sprocket 29 against the air under pressure applied to chamber 73, see Fig. 10. When the shutter 21 completely blocks aperture 18, cam 102 strikes pin 106 and moves lever 107 against the film strip to disengage it from pin 97, as shown in Fig. 11. The distance between the positioning pin 97 and sprocket 29 and the number of frames of film is chosen so that the lower film loop "L₁" is pulled nearly straight when lever 107 starts to disengage the film strip from pin 97. Once the film strip has been released, the force on the lower film loop exerted by the air under pressure rapidly expands the lower loop and contracts the upper loop to move the film strip past aperture 18 and locate the succeeding predetermined film perforation substantially in position for engagement by pin 97, as shown in Fig. 12, the cam 102 having then been rotated past pin 106 so that the tension in the film strip pivots lever 107 into its normal position to permit pin 97 to engage the perforation. Pin 97 may also be biased by a spring to retain it in its normal position. At this point the perforation to be engaged by pin 97 is located just short of being in position over said pin. However, the film continues to move due to sprocket 27 and the pressure in the lower loop so that in a relatively short time the perforation comes into position and slips onto pin 97, thus registering the frame with aperture 18, the air under pressure in chamber 73 maintaining the upper edge of the perforation in engagement with surface 101 of pin 97. Following this operation, shutter 21 clears aperture 18 and the image is illuminated. The lower loop "L₁" is then reduced against the air pressure by sprocket 29, the upper loop "L" is increased by sprocket 27, and the cycle is repeated. The chamber 72 is maintained for the upper loop "L" and is provided to damp the vibration of the film tending to occur as said loop is contracted at the end of the pull-down stroke. An aperture 110 of the proper size is provided communicating with the atmosphere and limiting the damping action to a desirable degree.

As in the preferred embodiment, the amount of film advanced is determined by the difference in length of the upper loop in its expanded position and in its contracted position, the instantaneous position of sprocket 27 at the time of advance and shoe 75 defining the contracted position of the upper film loop. While the pin 97 is described in this second embodiment as being mounted in gate member 19 and the film is removed therefrom by lever 107, pin 97 may be slidably mounted in gate member 19, or pivotally mounted thereon so that cam 102 will intermittently actuate said pin to remove it from the film perforation just prior to advancement of the film strip.

In the third embodiment of the invention, sprocket 27 is driven in a manner hereinbefore described and air under pressure is continuously applied to chamber 72 by means of pipe 115 connected to a source similar to blower 94 disclosed in Fig. 9. Positioning pins 60 are spaced adjacent aperture 18 for a purpose already described. While in this embodiment the lower chamber is eliminated and the film strip is intermittently advanced by a Geneva drive mechanism, or a claw mechanism of any well known type, it is to be understood that the film strip can also be intermittently advanced by air pressure introduced into the lower chamber by means of the valve arrangement disclosed and described in connection with the first embodiment of the invention.

Figures 14, 15, 16, 17, 18, 19:
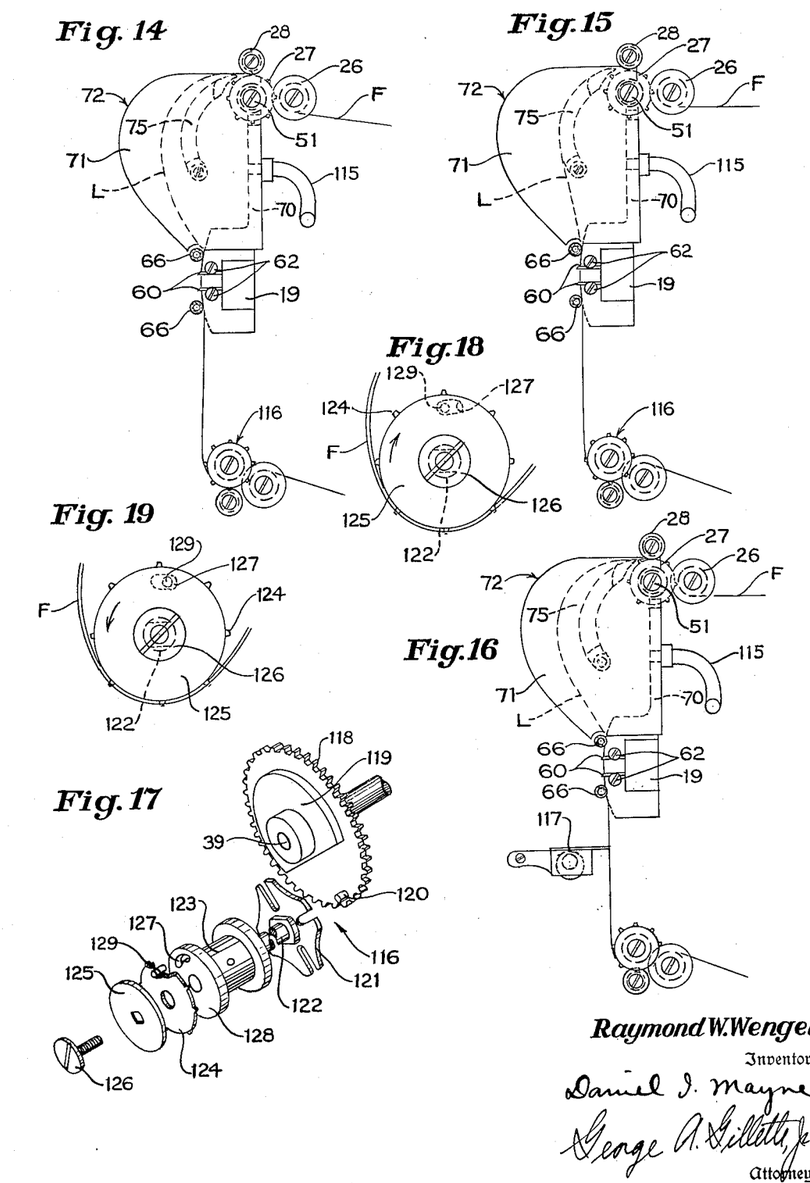
Fig. 14 is a diagrammatic right side elevation of a third embodiment of the invention in which the film strip is advanced intermittently by a Geneva mechanism and registered by air under pressure applied continuously to the upper film loop and showing the film strip in its registered position.
Fig. 15 is a diagrammatic view similar to Fig. 14 and showing the upper film loop in its contracted position immediately after advancement past the aperture in the gate member.
Fig. 16 is a diagrammatic view similar to Fig. 15 and in which the film strip is advanced intermittently by a claw-type pull-down mechanism.
Fig. 17 is an exploded perspective view of a Geneva drive mechanism and showing a lost motion connecting means between the drive mechanism and film sprocket for permitting retrograde movement of the sprocket.
Figs. 18 and 19 are enlarged detail end views of the sprocket member shown in Fig. 17 and showing the drive pin in one of its positions prior to being moved rearwardly by the retrograde movement of the film strip and in position for driving the sprocket member to advance the film strip, respectively.

In operation, the upper film loop is maintained under tension by the air pressure continuously applied to chamber 72 and tends to expand the loop to maintain the lower edge of a perforation against surface 63 of lower pin 60 as the film is fed into said chamber during the rest period of the image area at the gate aperture 18, see Figs. 14 and 16. During the interval that shutter 21 blocks illumination of aperture 18, the Geneva mechanism 116 or claw mechanism 117 advances the film strip by exerting a force on the film strip greater than that of the air pressure in the upper loop which disengages the film strip from pin 60, moves the film strip over the surface 65 of pin 60 and rapidly contracts the upper film loop to locate the succeeding predetermined film perforation opposite to and in position for engagement by pin 60. At the end of the pull-down period, the contracted position of the upper loop is defined by an instantaneous position of sprocket 27 and/or shoe 75, it being possible in this embodiment to eliminate shoe 75. The air under pressure, however, tends to expand the contracted upper loop and move the film strip in a retrograde direction until the lower edge of the film perforation engages surface 63 of the lower pin 60. Since air under pressure is continuously applied to chamber 72, the air tends to continually expand the upper film loop as it is enlarged by the film fed by sprocket 27 and to maintain the edge of the film perforation against surface 63 of pin 60.

Inasmuch as the film strip is moved in a retrograde direction after advancement, the claw mechanism 117 is preferably of the type in which the claw is immediately withdrawn from the film perforation after advancement, and the Geneva mechanism 116 must be provided with a lost motion device to permit such movement of the film strip. As shown in Fig. 17, the Geneva drive gear 118 has a locking portion 119 and a drive pin 120, the gear 118 being a part of gear train 36 or in the form of a disc secured to motor shaft 39. The Geneva wheel 121 is integral with shaft 122 to which the film-supporting roller 123 is secured so as to rotate therewith. Sprocket member 124 is freely rotatable on shaft 122 and is maintained thereon by the washer 125 which is rotatable with shaft 122 and maintained thereon by screw 126. To provide a driving connection between Geneva wheel 121 and sprocket member 124, which will drive said sprocket member positively in a direction to advance the film strip and which will permit the retrograde movement of the film strip to move said sprocket member in the same direction, a lost motion connecting means is provided between roller 123 and sprocket member 124. The lost motion connecting means comprises an arcuate slot 127 in flange 128 adjacent sprocket member 124 and a pin 129 carried by said sprocket member and movable in said arcuate slot. When the Geneva wheel 121 is rotated by pin 120 in a counterclockwise direction, pin 129 will usually be in a position with respect to slot 127, as shown in Fig. 19, wherein the slot immediately picks up pin 129 to drive the sprocket member 124 in the same direction. However, it is possible that pin 129 may be spaced by a small amount from the driving end of slot 127 in which case roller 123 is rotated through a very small angle before sprocket member 124 is driven therewith. When Geneva wheel 121 is stopped by locking portion 119, the momentum imparted to sprocket member 124 by the Geneva mechanism tends to rotate sprocket member 124 through a relatively small angle since it is freely rotatable on shaft 122. As a result, pin 129 moves forward in slot 127, the maximum movement being determined by slot 127 as shown in Fig. 18, and sprocket member 124 is rotated in a clockwise direction by the retrograde movement of the film strip as described hereinbefore. Therefore, either the claw mechanism 117 or the Geneva mechanism 116 provided with a lost motion connecting means constitutes an advancing means for intermittently advancing the film strip past the aperture 18 in gate member 19 and for permitting retrograde movement of the film strip as the upper film loop is expanded immediately after advancement by the air pressure in chamber 72 as described hereinbefore.

While the film strip is advanced past the aperture in the gate member by air under pressure applied alternately to the preformed upper and lower loop, by air under pressure applied continuously to a preformed lower loop, or by mechanical advancing means, the air under pressure performs a function that is common to all of the embodiments shown and that is the air under pressure maintains the film strip in proper registry. This is accomplished by the air under pressure tending to expand the film loop and maintaining the film strip under tension so that an edge of the film perforation engaging the positioning pin is held against the fixed surface of said pin during the rest period of the film strip. With this arrangement, the same edge of each perforation is utilized for registering the image area with the fixed aperture in the gate member.

In the various embodiments of the invention, the film strip is described as being advanced until the contracted loop, as determined by an instantaneous position of sprocket 27 and shoe 75, positions the succeeding predetermined perforation opposite to and in position for engagement by the registering pin. This assumes that the perforations are spaced in accordance with an established normal pitch and that retrograde movement of the film strip takes place immediately following advancement. However, it was deemed advisable because of shrinkage which is inherent in a film strip to provide a slight lag in the retrograde movement of the film strip, the lag permitting the continuously rotating sprocket and/or the air pressure to move the edge of the film perforation slightly beyond the engaging surface of the pin to insure engagement of the perforation by the pin as the film strip is moved in a retrograde direction. The film strip, therefore, is advanced as described so that a perforation is substantially opposite the pin and is moved a small amount past the pin to insure engagement of the perforation by the pin upon retrograde movement of the film strip by the expanding film loop.

To permit the air pressure in the chamber in which the film loop is rapidly contracted to return to atmospheric pressure as rapidly as possible, exhaust ports, such as the aperture 110 shown in the second embodiment, may be employed. The ports may be made adjustable to provide the best dampening action and leakage of air. Such an arrangement may also be in the form of exhaust valves which are actuated in synchronism with the inlet valves or the film advancing means and shutter.

Since other modifications and variation of the elements and devices shown herein are possible, the scope Having now particularly described my invention, what I desire to secure by Letters Patent of the United States and what I claim is:

1. In photographic apparatus, the combination with a gate member provided with an aperture, and an advancing means for engaging spaced portions of a film strip and for continuously feeding said film strip into an upper preformed film loop and from a lower preformed film loop, said film loops having a contracted position determined by the shortest film path between an instantaneous position of said advancing means and said gate member, of an air chamber above and below said gate member, said chambers being adjacent said gate member and having open ends adapted to be substantially enclosed by said film loops, a positioning pin located adjacent the aperture in said gate member for intermittently engaging a perforation in said film strip during the contracted position of said upper loop, having a first surface in a fixed plane with respect to the direction of film movement for engaging the edge of said perforation to register an image thereon with said aperture and a second surface inclined toward said first surface for permitting movement of said film strip over said pin, means for applying air under pressure to said upper and lower air chambers, and valve means adapted to admit said air under pressure alternatively and in properly timed relation to said lower and upper air chambers, the air pressure in said lower chamber tending to expand said lower film loop for moving said film strip over said second surface and past said aperture and rapidly contracting said upper film loop until the instantaneous position of said advancing means locates a succeeding predetermined film perforation opposite to and in position for engagement by said positioning pin, and the air pressure in said upper chamber tending to expand said upper loop to concurrently cause retrograde movement of said film strip for moving one edge of the perforation engaging said positioning pin against said first surface thereof and maintaining said edge against said first surface as long as said air is admitted to said upper chamber.

2. In photographic apparatus having an operating cycle comprising an advancing period and a rest period for a film strip, the combination with a gate member provided with an aperture, and an advancing means for engaging spaced portions of a film strip and for continuously feeding said film strip into an upper preformed film loop and from a lower preformed loop, said film loops having a contracted position determined by the shortest film path between an instantaneous position of said advancing means and said gate member, of an air chamber above and below said gate member, said chambers being adjacent said gate member and having open ends adapted to be substantially enclosed by said film loops, a positioning pin located adjacent the aperture in said gate member for intermittently engaging a perforation in said film strip during the contracted position of said upper loop, having a first surface in a fixed plane with respect to the direction of film movement for engaging the edge of said perforation to register an image thereon with said aperture and a second surface inclined toward said first surface for permitting movement of said film strip over said pin, means for providing air under pressure to said upper and lower air chambers, valve means adapted to admit said air under pressure during said advancing period to said lower chamber, said air pressure tending to expand said lower film loop for moving said film strip over said second surface and past said aperture and rapidly contracting said upper film loop until the instantaneous position of said advancing means locates a succeeding predetermined film perforation opposite to and in position for engagement by said positioning pin, a second valve means adapted to admit said air under pressure during said rest period to said upper chamber, said air pressure tending to expand said upper film loop to concurrently cause retrograde movement of said film strip for moving one edge of the perforation engaging said positioning pin against said first surface thereof and maintaining said edge against said first surface during said rest period, and an actuating means operatively connected to said first and second valve means and adapted to operate said first and second valve means in properly timed relation to said advancing and rest periods.

3. In photographic apparatus having an operating cycle comprising an advancing period and a rest period for a film strip, the combination with a gate member provided with an aperture, and sprocket means above and below said gate member for engaging spaced portions of said film strip and for continuously feeding said film strip into an upper preformed film loop and from a lower preformed loop, said film loops having a contracted position determined by the shortest film path between an instantaneous position of said advancing means and said gate member, of an air chamber above and below said gate member, each chamber being adjacent said gate member and having open ends adapted to be substantially enclosed by said film loops and provided with an air inlet port, a positioning pin located adjacent the aperture in said gate member for intermittently engaging a perforation in said film strip during the contracted position of said upper loop, having a first surface in a plane substantially perpendicular to the direction of film movement for engaging the edge of said perforation to register an image thereon with said aperture and a second surface inclined toward said first surface for permitting movement of said film strip over said pin, means for providing air under pressure to said upper and lower air chambers, rotary valve means adjacent said upper air chamber and provided with an aperture adapted to admit said air under pressure to said upper air chamber during said rest period, a second rotary valve means adjacent said lower air chamber and provided with an aperture adapted to admit said air under pressure to said lower air chamber during said advancing period, and a drive means operatively connected to said first and second valve means for rotating said valve means in a properly timed relation whereby said air under pressure admitted to said lower chamber tends to expand said lower film loop for moving said film strip over said second surface and past said aperture and rapidly contracting said upper film loop until the instantaneous position of said upper sprocket means locates a succeeding predetermined film perforation opposite to and in position for engagement by said positioning pin, and said air under pressure admitted to said upper chamber tends to expand said upper film loop to concurrently cause retrograde movement of said film strip for moving one edge of the perforation engaging said positioning pin against said first surface thereof and maintaining said edge against said first surface during said rest period.

4. In photographic apparatus, the combination with a gate member provided with an aperture, and an advancing means for engaging spaced portions of a film strip and for continuously feeding said film strip into an upper preformed film loop and from a lower preformed film loop, said film loops having a contracted position determined by the shortest film path between an instantaneous position of said advancing means and said gate member, of an air chamber above and below said gate member, each chamber being adjacent said gate member and having spaced side walls providing an opening adapted to be substantially closed by the film in said loops and providing clearances between said side walls and the edges of said film strip to permit side weave thereof, a positioning pin located adjacent the aperture in said gate for intermittently engaging a perforation in said film strip, having a first surface in a fixed plane with respect to the direction of film movement for engaging the edge of said perforation to register an image thereon with said aperture and a second surface inclined toward said first surface for permitting movement of said film strip over said pin, means for applying air under pressure to said upper and lower air chambers, and valve means adapted to admit said air under pressure alternately and in properly timed relation to said lower and upper air chambers, the air pressure in said lower chamber tending to expand said lower film loop for moving said film strip over said second surface and past said aperture and rapidly contracting said upper film loop until the instantaneous position of said advancing means locates a succeeding predetermined film perforation opposite to and in position for engagement by said positioning pin, and the air pressure in said upper chamber tending to expand said upper loop to concurrently cause retrograde movement of said film strip for moving one edge of the perforation engaging said positioning pin against said first surface thereof and maintaining said edge against said first surface as long as said air is admitted to said upper chamber.

5. In photographic apparatus having an operating cycle comprising an advancing period and a rest period for a film strip, the combination with a gate member provided with an aperture, and sprocket means above and below said gate member for engaging spaced portions of said film strip and for continuously feeding said film strip into an upper preformed film loop and from a lower preformed loop, said film loops having a contracted position determined by the shortest film path between an instantaneous position of said sprocket means and said gate member, of an air chamber above and below said gate member, each chamber being adjacent said gate member and having spaced side walls providing an opening adapted to be substantially closed by the film in said loops and providing clearances between said side walls and the edges of said film strip to permit side weave thereof, air inlet ports provided in said side walls, a positioning pin located adjacent the aperture in said gate member for intermittently engaging a perforation in said film strip during the contracted position of said upper loop, having a first surface in a plane substantially perpendicular to the direction of film movement for engaging the edge of said perforation to register an image thereon with said aperture and a second surface inclined toward said first surface for permitting movement of said film strip over said pin, means for providing air under pressure to said upper and lower air chambers, rotary valve means adjacent said upper air chamber and provided with an aperture adapted to admit said air under pressure through one of said ports and to said upper air chamber during said rest period, a second rotary valve means adjacent said lower air chamber and provided with an aperture adapted to admit said air under pressure through the other port and to said lower air chamber during said advancing period, and a drive means operatively connected to said first and second valve means for rotating said valve means in a properly timed relation whereby said air under pressure admitted to said lower chamber tends to expand said lower film loop for moving said film strip over said second surface and past said aperture and rapidly contracting said upper film loop until the instantaneous position of said upper sprocket means locates a succeeding predetermined film perforation opposite to and in position for engagement by said positioning pin, and said air under pressure admitted to said upper chamber tends to expand said upper film loop to concurrently cause retrograde movement of said film strip for moving one edge of the perforation engaging said positioning pin against said first surface thereof and maintaining said edge against said first surface during said rest period.

References Cited in the file of this patent

UNITED STATES PATENTS

| Number | Name | Date |
|---|---|---|
| 1,244,920 | Thomas | Oct. 30, 1917 |
| 1,309,471 | Evans | July 8, 1919 |
| 1,388,892 | Ramsey | Aug. 30, 1921 |
| 1,393,735 | Anselmi et al. | Oct. 18, 1921 |
| 1,545,195 | Nogues | July 7, 1925 |
| 1,876,845 | Bowen et al. | Sept. 13, 1932 |
| 1,923,855 | Victor | Aug. 22, 1933 |
| 1,980,600 | Spoor | Nov. 13, 1934 |
| 2,431,254 | Jacobson | Nov. 18, 1947 |
| 2,560,918 | Bedford et al. | July 17, 1951 |
| 2,560,919 | Bedford | July 17, 1951 |
| 2,601,347 | Waller | June 24, 1952 |